3,152,073
METHOD FOR THE STERILIZATION OF WATER
John R. Morton, St. Louis, Mich., assignor to Michigan Chemical Corporation
No Drawing. Filed Dec. 3, 1959, Ser. No. 856,951
13 Claims. (Cl. 210—62)

This invention relates to a method for the sterilization of water and more particularly to a method by which water is sterilized by the addition of a quaternary ammonium polyhalide, which carries one or more halogens selected from the group consisting of chlorine, bromine and iodine.

The method of this invention is adapted for the sterilization of water to be used for a wide variety of purposes. It is adapted for the sterilization of water for human consumption and is particularly well suited for emergency sterilization of water. Also, it is well suited for the sterilization of swimming pool water and its use for that purpose will be described in detail. However, it will be understood that the invention is not limited to the sterilization of swimming pool water and that the following description of the specific application of the method to the sterilization of swimming pool water is applicable, with obvious modifications, to the sterilization of water for any use, inasmuch as both the requirements for the sterilization of swimming pool water and the sanitary standards which must be met in its sterilization are rigorous. In general, swimming pool water must be kept in a potable condition, despite its continued pollution by the bodies of the swimmers.

Elemental chlorine is widely used in the sterilization of water for a wide variety of uses. It is generally used for the sterilization of municipal water supplies. At normal temperatures and pressures chlorine is a heavy greenish-yellow gas with a suffocating odor. It is highly corrosive to metals. It is destructive to living tissue. Air containing more than about four parts per million is dangerous to breathe. Swimming pool water containing more than about one part per million tends to be irritating to the skin and eyes of a swimmer. Chlorine is usually liquefied under pressure and loaded into special steel cylinders for commercial use. The steel cylinders are heavy and cumbersome to handle and materially increase the cost of transporting the chlorine. Thus, standard cylinders carry 105 pounds and 150 pounds of chlorine and weigh 190 pounds and 272 pounds, respectively.

The use of chlorine in the sterilization of water must be surrounded by many safeguards, since it is under pressure and is highly corrosive and toxic in nature. Especially designed chlorinators, under careful control, are necessary for the feeding of chlorine gas to the water. The chemical reactions involved in the use of chlorine gas in the sterilization of water may be represented by the following equations:

$$Cl_2 + H_2O \rightarrow HCl + HClO \quad \text{(Equation I)}$$

$$HClO \rightarrow HCl + [O] \quad \text{(Equation I}(a)\text{)}$$

The nascent oxygen released by the hypochlorous acid is generally regarded as the effective material in the sterilization of water, although it is frequently suggested that these equations are an over-simplification of the mechanism involved.

The necessity to periodically sterilize the water of a swimming pool to keep it in a safe and sanitary condition is generally recognized. Elemental chlorine or bromine are ordinarily used for the sterilization of the water of the larger swimming pools, for example, those containing 80,000 gallons or more of water, because of the economics involved. Sodium hypochlorite and calcium hypochlorite are also used for the sterilization of swimming pool water. Iodine and combinations of bromine and iodine have also been used for this purpose, but their use has not been as fully developed as in the cases of chlorine and bromine.

Bromine is a liquid of relatively high specific gravity under normal conditions of temperature and pressure. Although more convenient to handle than chlorine due to its being a liquid, bromine and concentrated aqueous solutions of bromine are highly corrosive and must be handled with care. The chemical reactions involved in the sterilization of water by the use of bromine are generally regarded as being exactly parallel to those involved in the use of chlorine, as shown by the following equations:

$$Br_2 + H_2O \rightarrow HBr + HBrO \quad \text{(Equation II)}$$

$$HBrO \rightarrow HBr + (O) \quad \text{(Equation II}(a)\text{)}$$

Again, it is the nascent oxygen which is generally regarded as the effective sterilizing agent. This mechanism, however, does not explain the fact that, when compared on a molar basis, bromine is more effective than chlorine in the sterilization of water. The superiority of bromine over chlorine as a sterilizing agent for water is discussed by F. B. Beckwith and J. R. Moser, Journal of American Water-Works Association, vol. 25, page 367, 1933, and by the treatise entitled "Antiseptics, Disinfectants, Fungicides and Sterilization," by Reddish (1957).

Sodium hypochlorite or calcium hypochlorite is ordinarily used in the smaller swimming pools. Sodium hypochlorite in solid form is subject to hydration and difficult to use. For this reason, it is normally sold and used in the form of an aqueous solution. It is customarily sold at about 10 percent available chlorine content, and sometimes as high as 16 percent. The solution always contains excess sodium hydroxide or sodium carbonate and is therefore highly alkaline. The chemical reaction involved in the use of sodium hypochlorite is as follows:

$$NaClO \rightarrow NaCl + (O) \quad \text{(Equation III)}$$

Calcium hypochlorite is sold as a solid which may be in the form of a granular powder or in the form of pellets. It contains 65–70 percent available chlorine and is contaminated with calcium hydroxide, which causes it to be alkaline in reaction. No gas hazard is involved in the use of the calcium hypochlorite, but it needs to be kept dry at all times in handling and storage to avoid decomposition. Moreover, it may be added directly to the pool water with no special dispensing equipment of any kind, although hand-dosing is usually considered undesirable. The use of dissolving baskets or a dissolving cylinder is desirable to regulate the dosage of the water. Calcium hypochlorite has been considered the most convenient of the disinfecting agents for use in small pools where close technical supervision is impractical, because of its solid form and the ease with which it can be handled, stored and used. For these reasons, it is widely used in sterilizing private swimming pools.

The chemical reaction involved in the use of calcium hypochlorite is represented by the following equation:

$$Ca(ClO)_2 \rightarrow CaCl_2 + 2(O) \quad \text{(Equation IV)}$$

The control of the hydrogen ion concentration (pH) of the water of a swimming pool is important. In disinfecting swimming pools, when the pH of the water is below about 7.0 or above about 8.4, the water may cause skin and eye irritation to the swimmers. Chlorine tends to lower the pH of the water since as shown by Equation I and I(a) it produces hydrochloric acid when it reacts with water to produce nascent oxygen. On the other hand, sodium hypochlorite and calcium hypochlorite tend to raise the pH of the water due to their contamination with sodium hydroxide and calcium hydroxide, respectively. For these reasons additional reagents are necessary to control the pH of the swimming pool when using these materials as disinfecting agents. Sodium carbonate is normally used to raise the pH into the safe range when it drops during the use of chlorine while sodium acid sulfate is used to lower the pH when it rises above that range when using sodium hypochlorite or calcium hypochlorite. Thus, in the sterilization of swimming pool water with elemental chlorine, with sodium hypochlorite or with calcium hypochlorite, it is necessary to use not one, but two different reagents.

As indicated by Equations II and II(a), bromine produces hydrobromic acid when it reacts with water to produce nascent oxygen. Peculiarly enough, bromine does not cause a material change in the pH of the water and does not require the addition of another reagent, such as sodium carbonate, to re-adjust the pH of the water despite this production of hydrogen bromide. The reason for this observed fact is not known, although it may be speculated that the hydrobromic acid reacts with organic matter in the swimming pool water before it can materially affect the pH of the water.

Calcium hypochlorite has the disadvantage of causing turbidity in the water of a swimming pool. This turbidity is caused by the contaminating calcium hydroxide carried by the calcium hypochlorite. This calcium hydroxide can itself cause turbidity and can form calcium carbonate by reaction with the carbon dioxide carried by the water. This makes necessary the use of an additional reagent to sequester the calcium ions, such as, for example, sodium hexametaphosphate to maintain the desirable clarity of the swimming pool water. The necessity to utilize two additional reagents, one to control pH and the other to control turbidity when using calcium hydrochlorite, is a disadvantage which materially nullifies the advantages of the calcium hypochlorite arising from its solid form and its ease of handling, storage and use.

It is an object of this invention to provide a method for sterilzing water which involves the use of a single solid reagent, which is simple, effective and safe.

A further object is to provide a method for disinfecting swimming pools by the use of a single reagent which provides the various advantageous features arising from the use of calcium hypochlorite, without the serious disadvantages arising from its tendency to increase the pH of the swimming pool water and to cause the swimming pool water to be turbid.

Other objects of his invention and its various advantageous features will become apparent from the detailed description of this invention which follows.

The method in accordance with this invention comprises the essential step of dissolving in the water to be sterilized a tetraalkylammonium polyhalide in which the halogen atoms are from the group consisting of chlorine, bromine and iodine, and in which the alkyl groups are lower alkyl groups selected from the group consisting of alkyl groups containing from one to six carbon atoms in which the carbon chain is straight, alkyl groups containing from one to six carbon atoms in which the carbon chain is branched, halogenated alkyl groups containing from one to six carbon atoms in which the carbon chain is straight, and halogenated alkyl groups containing from one to six carbon atoms in which the carbon chain is branched. Suitable tetraalkylammonium polyhalides for use in this method are for example:

Tetramethylammonium polyhalide
Ethyltrimethylammonium polyhalide
Dimethyldiethylammonium polyhalide
Methyltriethylammonium polyhalide
Tetraethylammonium polyhalide
Ethylpropyldimethylammonium polyhalide
Methylpropyldiethylammonium polyhalide
Propyltrimethylammonium polyhalide
Propyltriethylammonium polyhalide
Tetrapropylammonium polyhalide
Ethylbutyldimethylammonium polyhalide
Methylethylpropylbutylammonium polyhalide
Methylbutyldiethylammonium polyhalide
Butyltrimethylammonium polyhalide
Dimethyldibutylammonium polyhalide
Diethylbibutylammonium polyhalide
Tetrabutylammonium polyhalide
Ethylpentyldimethylammonium polyhalide
Methylpentyldiethylammonium polyhalide
Pentyltriethylammonium polyhalide
Pentyltrimethylammonium polyhalide
Dimethyldipentylammonium polyhalide
Diethyldipentylammonium polyhalide
Ethylhexyldimethylammonium polyhalide
Methylhexyldiethylammonium polyhalide
Hexyltriethylammonium polyhalide
Hexyltrimethylammonium polyhalide
Diethyldihexylammonium polyhalide
Diethyldihexylammonium polyhalide
5-Chloropentyltrimethylammonium polyhalide
Pentamethylene-bis-trimethylammonium polyhalide
2-Chloroethyltrimethylammonium polyhalide
Chloromethyltrimethylammonium polyhalide in which the polyhalide groups is one of the following combinations:

enneaiodide
heptaiodide
pentaiodide
triiodide
bromohexaiodide
bromodiiodide
chlorotetraiodide
chlorodiiodide
iododichloride
iododibromide
chlorobromoiodide
tribromide
bromodichloride
iodotetrachloride
chlorodibromide It will be noted that each of the thirty-three polyhalides listed in the first of the above groups differ from one another as to the combination of alkyl groups which they carry. Since each of the polyhalides listed in this first group may carry any one of fifteen specific polyhalide combinations listed in the second group, this listing includes a total of four hundred and ninety-five compounds. The compounds are listed in this manner merely for the sake of brevity and clarity.

The preparation of the tetraalkylammonium polyhalides is well known to the prior art. Two references to the preparation of these compounds are: Frederick D. Chattaway and George Hoyle, "The Journal of the Chemical Society," volume 123, pages 655 to 662, inclusive, Gurney and Jackson, London, 1923; and Alexander I. Popov and Robert E. Buckles, "Inorganic Synthesis," volume V, pages 175–178, inclusive, McGraw-Hill Book Company, Inc., New York, 1957.

When these compounds come into contact with water they release all except one of their halogen atoms, which reacts with water to produce the corresponding hypohalous acid. The hypohalous acid then, in turn, reacts with water to produce nascent oxygen. The halogen atom which is not released in the first reaction is the lowest atomic weight halogen atom carried by the original compound or one of the lowest atomic weight halogen atoms when more than one such atom is carried by the original compound. The reactions which occur when these compounds are added to water in carrying out the method of this invention may be illustrated by that of tetramethylammonium chlorodibromide as follows:

$$(CH_3)_4NClBr_2 + H_2O \rightarrow (CH_3)_4NCl + Br_2 \quad \text{(Equation V)}$$
$$Br_2 + H_2O \rightarrow HBr + HBrO \quad \text{(Equation V}(a)\text{)}$$
$$HBrO \rightarrow HBr + (O) \quad \text{(Equation V}(b)\text{)}$$

As will be appreciated from the foregoing equations, the tetraalkylammonium polyhalides are directly comparable to the elemental halogens in their action in sterilizing water rather than to sodium hypochlorite or calcium hypochlorite, since they dissociate to release free halogens which react with the water.

The tetraalkylammonium polyhalides in which the alkyl groups contain more than six carbon atoms release halogen atoms in the manner illustrated by Equation V for the tetramethylammonium chlorobromide. However, these compounds, unlike those having alkyl groups containing from one to six carbon atoms, are not particularly suitable for use in sterilizing water because of two interrelated factors. The first of these is the tendency of the residual tetraalkylammonium monohalide to act as a surface active agent which causes foaming and the second is the smaller percentage by weight of the releasable halogen which they carry. The smaller percentage of releasable halogen carried by these compounds makes necessary the addition of a larger amount of the compound to water to provide a given amount of free halogen in the water. The use of the larger amount of the compound not only increases the cost of treating the water, but also increases the tendency of the water to foam.

The tetraalkyl ammonium polyhalides having alkyl groups carrying from one to six carbon atoms contain a relatively high percentage of releasable halogen. This fact is illustrated by Table I which shows the percentage of bromine carried by a series of specific tetraalkylammonium chlorobromides which may be used by the method in accordance with this invention. As shown by Equation V for the tetramethylammonium chlorodibromide, these compounds release both of their bromine atoms, i.e., their entire bromine content.

TABLE I

*Bromine Content of Tetraalkylchlorobromides Having Alkyl Groups Containing One to Six Carbon Atoms*

| Compound | Molecular weight | Percent Br by weight |
|---|---|---|
| Tetramethylammonium chlorodibromide | 269.42 | 59.3 |
| Ethyltrimethylammonium chlorodibromide | 283.45 | 56.4 |
| Dimethyldiethylammonium chlorodibromide | 297.48 | 53.7 |
| Methyltriethylammonium chlorodibromide | 311.51 | 51.3 |
| Tetraethylammonium chlorodibromide | 325.54 | 49.1 |
| Ethylpropyldimethylammonium chlorodibromide | 311.51 | 51.3 |
| Methylpropyldiethylammonium chlorodibromide | 325.54 | 49.1 |
| Propyltrimethylammonium chlorodibromide | 297.48 | 53.7 |
| Propyltriethylammonium chlorodibromide | 339.57 | 47.1 |
| Tetrapropylammonium chlorodibromide | 381.66 | 41.9 |
| Ethylbutyldimethylammonium chlorodibromide | 325.54 | 49.1 |
| Methylethylpropylbutylammonium chlorodibromide | 353.60 | 45.2 |
| Methylbutyldiethylammonium chlorodibromide | 339.57 | 47.1 |
| Butyltrimethylammonium chlorodibromide | 311.51 | 51.3 |
| Dimethyldibutylammonium chlorodibromide | 353.60 | 45.2 |
| Diethyldibutylammonium chlorodibromide | 381.66 | 41.9 |
| Tetrabutylammonium chlorodibromide | 437.78 | 36.5 |
| Ethylpentyldimethylammonium chlorodibromide | 339.57 | 47.1 |
| Methylpentyldiethylammonium chlorodibromide | 353.60 | 45.2 |
| Pentyltriethylammonium chlorodibromide | 367.63 | 43.5 |
| Pentyltrimethylammonium chlorodibromide | 325.54 | 49.1 |
| Dimethyldipentylammonium chlorodibromide | 381.66 | 41.9 |
| Diethyldipentylammonium chlorodibromide | 409.72 | 39.0 |
| Ethylhexyldimethylammonium chlorodibromide | 353.60 | 45.2 |
| Methylhexyldiethylammonium chlorodibromide | 367.63 | 43.5 |
| Hexyltriethylammonium chlorodibromide | 381.66 | 41.9 |
| Hexyltrimethylammonium chlorodibromide | 339.57 | 47.1 |
| Dimethyldihexylammonium chlorodibromide | 409.72 | 39.0 |
| Diethyldihexylammonium chlorodibromide | 437.78 | 36.5 |
| 5-Chloropentyltrimethylammonium chlorodibromide | 360.00 | 44.4 |
| Pentamethylene-bis-trimethylammonium chlorobidromide | 578.93 | 55.2 |
| 2-chloroethyltrimethylammonium chlorodibromide | 317.91 | 50.3 |
| Chloromethyltrimethylammonium chlorodibromide | 303.88 | 52.6 |

From the data of Table I, it will be noted that all of the compounds listed contain more than 36%, by weight, of bromine and that a number of them contain more than about 50% bromine. From the standpoint of the economics involved, I found that it is desirable to use tetraalkylammonium polyhalides which carry at least about 40%, by weight, of releasable halogen, and prefer those which contain more than about 50%, by weight, of releasable halogen.

Table II presented hereinafter shows the amounts of a series of different tetraalkylammonium polyhalides necessary to provide three different concentrations of free halogen in 10,000 gallons of water. The corresponding polyhalides of the chlorodibromides listed in Table I bear exactly the same relationships to each of the others that is shown by the tetramethylammonium polyhalides listed in Table II.

From the data of Table I it will be noted that tetramethylammonium chlorodibromide contains 59.3%, by weight, of releasable bromine. Reference to Table II will show the other tetramethylammonium polyhalides listed in that table carrying even more releasable halogen than the chlorodibromide, with the exception of the triodide, iododibromide, the tribromide and the bromodichloride which carry only slightly less releasable halogen. In general, I have found that the tetramethylammonium polyhalides are well suited for the sterilization of water. In view of this fact and their high content of releasable halogen, I prefer them to the other tetraalkylammonium polyhalides.

In carrying out the method in accordance with this invention, the water may be treated periodically with the tetraalkylammonium polyhalide to sterilize it, without maintaining any particular residual halogen content in the water. This method is convenient to use for keeping private pools in a sanitary condition. The quantity of the tetraalkylammonium polyhalide which is added to the water will depend upon the particular compound chosen and upon the amount of organic matter carried by the water. In general, it is desirable to add an amount of the compound which will provide upon reaction with the water an amount of free halogen in the water within the range of about 0.4 to about 2.0 parts per million. The daily use of an amount of the compound which will provide upon reaction with the water about 1.5 parts per million of free halogen in the water is ordinarily adequate to keep swimming pool water in a sanitary condition.

The quantities in ounces (avoirdupois) of each of a series of tetramethylammonium polyhalides, which when dissolved in 10,000 gallons of water will provide 0.45, 0.9 and 3.6 parts per million of free halogen in the water is given by Table II.

TABLE II

*Quantities of Tetramethylammonium Polyhalides in Avoirdupois Ounces Which Will Provide 0.45, 0.9 and 3.6 p.p.m. of Free Halogen When Dissolved in 10,000 Gallons of Water*

| Compound | P.p.m. of Free Halogen Released | | |
|---|---|---|---|
| | 0.45 | 0.9 | 3.6 |
| | Ounces | Ounces | Ounces |
| Tetramethylammonium enneadiodide | 0.72 | 1.4 | 5.8 |
| Tetramethylammonium heptaiodide | 0.76 | 1.5 | 6.1 |
| Tetramethylammonium pentaiodide | 0.84 | 1.7 | 6.7 |
| Tetramethylammonium triiodide | 1.08 | 2.2 | 8.6 |
| Tetramethylammonium bromohexaiodide | 0.72 | 1.4 | 5.8 |
| Tetramethylammonium bromodiiodide | 0.96 | 1.9 | 7.7 |
| Tetramethylammonium chlorotetraiodide | 0.73 | 1.5 | 5.8 |
| Tetramethylammonium chlorodiiodide | 0.86 | 1.7 | 6.9 |
| Tetramethylammonium iododibromide | 1.05 | 2.1 | 8.4 |
| Tetramethylammonium iododichloride | 1.01 | 2.0 | 8.1 |
| Tetramethylammonium chlorobromoiodide | 0.92 | 1.8 | 7.4 |
| Tetramethylammonium tribromide | 1.18 | 2.4 | 9.4 |
| Tetramethylammonium bromodichloride | 1.17 | 2.3 | 9.4 |
| Tetramethylammonium iodotetrachloride | 0.88 | 1.8 | 7.0 |
| Tetramethylammonium chlorodibromide | 1.01 | 2.0 | 8.1 |

As will be seen from Table I an amount of, for example, tetramethylammonium chlorodibromide used for each 10,000 gallons of swimming pool water will usually fall within the range of about 2.0 to about 4.4 ounces. Ordinarily about 3.3 ounces of tetramethylammonium chlorodibromide per 10,000 gallons of water will keep the pool water in a sanitary condition when used on a daily basis, in the absence of algae.

From the data of Tables I and II the quantity of each of the tetraalkylammonium polyhalides required to release any desired quantity of free halogen in any specified volume of water can be readily computed.

In the foregoing it is noted that the amounts of the tetramethylammonium polyhalides given are those required to keep swimming pool water in a sanitary condition in the absence of algae growths in the pool. When algae is present, the concentration of free halogen required to keep the pool water in a sanitary condition is materially increased and it is usually desirable to eradicate the algae by an appropriate treatment with an algaecide.

In carrying out the method of this invention for the purpose of keeping swimming pool water in a sanitary condition by the periodic treatment of the pool water, the appropriate quantity of the tetraalkylammonium polyhalide in powdered form may be added to the pool water by hand-dosing. However, it is preferable to place lumps of the material, which in total weight will give the desired concentration of free halogen in the swimming pool water, in perforated plastic containers and suspend them at different locations in the water of the pool. Again, in the case of pools which are provided with circulating and filtration systems, as is usually the case, the tetraalkylammonium polyhalide may be introduced, for example, into the swimming pool water on the exit or entrance side of the circulating pump.

In an alternative embodiment of this method, the tetraalkylammonium polyhalide is introduced into the swimming pool on a continuous or semi-continuous basis which will maintain a pre-determined halogen content in the pool water as determined by periodic chemical analyses of the water. The residual content of chlorine, bromine or iodine or a combination thereof which is maintained in the swimming pool water may be within the range of about 0.4 to about 2.0 parts per million and is preferably not allowed to exceed 0.6 part per million. In the case of chlorine it is undesirable to exceed 1.0 part per million since at higher levels it becomes irritating to the eyes and the skin of swimmers. The rate at which the tetraalkylammonium polyhalide must be fed to a swimming pool to maintain any residual halogen content which may be desired depends, of course, upon the capacity of the pool, and will vary with the different halogens or combination of halogens, the weather conditions and the extent to which the pool is being used. For this reason it is impossible to pre-determine the rate of feed other than by direct analyses of the residual halogen content of the pool water. However, the figures given by Table II may be used as a guide. For example, if on the use of tetramethylammonium chlorodibromide it is judged that a swimming pool having a capacity of 50,000 gallons requires a feed of 2 parts per million of bromine during a twelve hour period to maintain a residual bromine content of 0.5 part per million, it will be seen from Table II that 22 ounces of the tetramethylammonium chlorodibromide must be fed to the pool during each twelve hour period.

Table III presents data obtained by the use of the method in accordance with this invention in the sterilization of a swimming pool containing approximately 40,000 gallons of water, in which tetramethylammonium chlorodibromide was introduced into the pool water by feeding it into the circulating water on the outlet side of the pool's circulating pump described above. The tetramethylammo-

TABLE III

*Treatment of 40,000 Gallon Pool With Tetramethylammonium Chlorodibromide*

| Day | 1 | 2 | 3 | 4 | 5 | 8 | 6 | 7 | 9 | 10 | 11 | 12 |
|---|---|---|---|---|---|---|---|---|---|---|---|---|
| No. of swimmers per day | 6 | 8 | 23 | 6 | 7 | 5 | | | 6 | 4 | 0 | 3 |
| IMMEDIATELY PRIOR TO TREATMENT | | | | | | | | | | | | |
| Lbs. of tetramethylammonium chlorodibromide used | 0.5 | 0.5 | 0.5 | 0.5 | 0.5 | 0.5 | 0.25 | 0.2 | 0.5 | 0.5 | ¹0.25 | 0.25 |
| Air temperature, °F | 82 | 80 | 83 | 75 | 74 | 70 | | | 69 | 64 | 68 | 74 |
| Water temperature, °F | 74 | 75 | 77 | 76 | 76 | 72 | | | 71 | 70 | 69 | 71 |
| pH of shallow end | 7.7 | 7.6 | 7.7 | 7.5 | 7.4 | 7.6 | | | 7.2 | 7.2 | 7.5 | 7.5 |
| pH at deep end | 7.9 | 7.6 | 7.6 | 7.6 | 7.4 | 7.4 | | | 7.2 | 7.2 | 7.5 | 7.5 |
| AFTER TREATMENT | | | | | | | | | | | | |
| Hours after treatment | 2 | 2 | 1.5 | 2.5 | 1.5 | 2.5 | | | 3.5 | 2 | 2 | 1.5 |
| pH at shallow end | 7.8 | 7.7 | 7.6 | 7.6 | 7.7 | 7.5 | | | 7.5 | 7.6 | 7.5 | 7.5 |
| pH at deep end | 7.7 | 7.7 | 7.6 | 7.6 | 7.7 | 7.5 | | | 7.5 | 7.6 | 7.5 | 7.5 |
| Streptococci count/100 ml | 0 | 0 | 0 | 16.0 | 0 | 0 | | | 9.2 | 0 | 0 | 0 |
| E. Coli count/100 ml | 0 | 16 | 0 | 16.0 | 0 | 0 | | | 0 | 0 | 0 | 0 |
| Total bacterial count/ml | 0 | 35 | 2 | 330 | 11 | 1540 | | | 520 | 490 | 2801 | 107 |
| Turbidity of water | None | None | None | ² | ³ | Hazy | | | Hazy | Trace | Trace | None |

¹ 2.5 pounds of tetramethylammonium chlorodibromide added in the evening.
² Green turbidity.
³ Brown turbidity.

nium chlorodibromide was added to the water of the swimming pool within a period of about two hours in the latter part of the morning on each of twelve successive days.

Table III presents comparative data as to the condition of the pool water immediately prior to the beginning of the introduction of the tetramethylammonium chlorodibromide and as to its condition 1½–3½ hours later, after the tetramethylammonium chlorodibromide had become effective in sterilizing the water. It will be noted from the data of Table III that the addition of the tetramethylammonium chlorodibromide to the pool water made no significant change in the pH of the water, and that the pH was well within the desirable range of about 7.0 to about 8.4 both before and after the addition of the tetramethylammonium chlorodibromide. In view of the fact that the tetramethylammonium chlorodibromide did not cause the drop in the pH which could have been expected from the chemical reactions involved as shown by Equations V and V(a) given hereinbefore, it was unnecessary, and in fact, undesirable to add a second reagent, such as sodium carbonate, to raise the pH of the water.

It is to be noted that the addition of one pound of the tetramethylammonium chlorodibromide on the first day resulted in zero counts for streptococci and $E.$ $coli$ as well as a total bacterial count of zero, showing that the pool water was completely sterilized. A reduction of the amount of tetramethylammonium chlorodibromide to one-half pound on the second day again caused no shift in the pH of the pool water. The bacterial counts were zero and 16 per 100 milliliters for streptococci and $E.$ $coli$, respectivly, with a total bacterial count of 35 per milliliter. These bacterial counts show that the pool water was in a quite sanitary condition, in view of the recognized maximum for the total bacterial count for public swimming pools is 200. As to the total count of 16 for $E.$ $coli$, it will be noted that the count was taken on a 100 ml. sample, rather than on a one milliliter sample as in the case of the usual method of determination.

The addition of one-half pound of tetramethylammonium chlorodibromide on the third day again caused no significant change in the pH of the water, and placed the pool water in an almost completely sterile condition with zero counts for both streptococci and $E.$ $coli$, with the quite low total bacterial count of 2.

One-half pound of tetramethylammonium chlorodibromide was again added on the fourth day, again with no significant effect on the pH. The count of 16 for both the streptococci and the $E.$ $coli$ was satisfactory, but the total bacterial count of 330 showed that the half-pound of tetramethylammonium chlorodibromide was insufficient to compensate for the unusual swimmer load of 23 people the preceding day. However, the additional one-half pound of the tetramethylammonium chlorodibromide on the fifth day returned the pool water to a sanitary condition as shown by zero counts for streptococci and $E.$ $coli$, respectively, and the low bacterial count of eleven.

The swimming pool water was treated with 0.25 pound of tetramethylammonium chlorodibromide on the sixth and with 0.5 pd. on the seventh day. Rain during the evening of the fifth day resulted in an algae growth by the morning of the eighth day which rendered the pool greenish in color. On the eighth, ninth, tenth and eleventh day the algae was eliminated as shown first by the appearance of a brown sediment in the bottom of the pool and finally a complete clearing of sediment from the pool. During this period it will be noted that from the ninth to the twelfth day the streptococci and $E.$ $coli$ counts were entirely satisfactory but that the total bacerial count was well above sanitary the maximum of 200 per milliliter.

This unsatisfactory result was caused by the presence of the algae growth. Other data has shown that the algae growth can be promptly eliminated by a shock treatment in which an amount of the tetramethylammonium chlorodibromide is added to the pool water which raises the bromine content of the pool water above the maximum at which the pool can be used without irritation to the skin and eyes of the swimmers, or in which another algaecide is used to destroy the algae.

A shock treatment during the evening of the eleventh day by the addition of 2.5 pounds of tetramethylammonium chlorodibromide, followed by the addition of 0.25 pound of this compound during the morning of the twelfth day returned the pool to a sanitary condition, as shown by the zero counts for streptococci and $E.$ $coli$ and the acceptable total bacterial count of 107 per milliliter.

The data presented by Table III fully demonstrates the effectiveness of the embodiment of the method in accordance with that invention in which tetramethylammonium chlorodibromide is used, in maintaining the swimming pool water in a sanitary condition when using relatively small quantities of the compound. This data fully demonstrates the advantages of the method arising from the fact that this compound has no significant effect on the pH of the water and does not cause turbidity in the water. The advantages entirely eliminate the necessity for using an additional reagent to control the pH within acceptable limits.

Further, it is to be noted that during the first three days of the treatment, no turbidity appeared in the pool water. The turbidity which developed on the fourth day was green in color and could readily be seen to be due to the growth of algae. The brown turbidity on the fifth day and the residual haze which persisted through the eleventh day was caused by dead algae. These treatments produced no residual haze comparable to that produced by the residual calcium hydroxide carried by calcium hypochlorite and no added reagent, such as sodium hexametaphosphate, was necessary or desirable in the treatment of the pool water. The effectiveness of the tetramethylammonium chlorodibromide in clearing up haze produced by the growth of algae was demonstrated by the clarity of the pool water on the twelfth day, after it had been hazy due to the presence of algae.

Thus, the method presents definite advantages over that in which chlorine, sodium hypochlorite or calcium hypochlorite is used as the sterilizing reagent. The tetramethylammonium chlorodibromide, like calcium hypochlorite is a solid which is convenient to ship, handle and store, but presents an advantage over calcium hypochlorite in addition to that arising from the fact that it does not require the use of a second reagent to adjust pH, in that it does not require the addition of a third reagent to avoid the development of turbidity in the water. This method also presents definite advantages over those in which elemental chlorine or bromine are used as the sterilizing agent arising from its solid state as compared with the normally gaseous form of chlorine and the liquid form of bromine.

Tetramethylammonium chlorodibromide and its aqueous decomposition products have been the subject of extensive toxicological evaluation. Studies were conducted with tetramethylammonium chlorobromide per se and upon a synthetic aqueous mixture of tetramethylammonium chloride and ammonium bromide. The synthetic aqueous mixture studied consisted of 2000 milligrams per liter (p.p.m.) of tetramethylammonium chloride and 3375 milligrams per liter (p.p.m.) of ammonium bromide. The latter material supplied bromide ions at a concentration of 2917 milligrams per liter (p.p.m.).

This synthetic aqueous mixture simulated, in its essential respects, a composition which theoretically might result after a suitable time following the decomposition of 4917 milligrams per liter of tetramethylammonium chlorodibromide. The latter solution would be expected to liberate 2000 milligrams per liter (p.p.m.) of tetramethylammonium chloride and 2917 milligrams per liter (p.p.m.) of free bromine. On the basis that all free bromine liberated was eventually converted entirely to the bromide ion, then the concentration used is the theoretical maximum which could be produced by 4917 milligrams per liter of tetramethylammonium chlorodibromide.

The tests conducted in this toxicological study with tetramethylammonium chlorodibromide per se were as follows: single dose acute oral toxicity—albino rats; single dose acute inhalation toxicity—albino rats; single dose acute percutaneous toxicity—albino rabbits.

In the single dose acute oral toxicity tests, healthy, young adult, Sprague-Dawley strain albino rats averaging 250 to 300 grams in body weight were employed as the test animals. The test rats had been maintained in the laboratory under observation for seven days prior to the initiation of the toxicological test in order to insure their general physical well-being and homogeneity as test animals. During this pre-test period the animals were maintained in stock cages upon standard laboratory rat ration which, along with water, was permitted ad libitum. Twenty-four hours prior to the toxicity test, all food was with-drawn but water was permitted.

The test group was composed of five male and five female albino rats. Each of these animals received a dose of 50 mg./kg. of body weight of the crystalline tetramethylammonium chlorodibromide directly into the stomach. The doses were administered by means of a polyethylene stomach tube. The test material was administered in the form of a 2.5 percent suspension of crystalline tetramethylammonium chlorodibromide in propylene glycol prepared immediately before use.

Immediately following incubation the rats were returned to their stock cages where food and water were permitted. The animals were kept under close observation for the next 48 hours in order to tabulate fatal reactions and to detect other signs or symptoms of systemic toxicity.

There were no deaths among the test group of ten rats during the 48 hour period subsequent to receiving the specified dose of 50 milligrams, per kilogram of body weight, of the crystalline tetramethylammonium chlorodibromide.

In the single dose acute inhalation toxicity tests, young adult albino rats of the Sprague-Dawley strain again were employed as the test animals. A single group of ten rats, five male and five female, averaging 250 to 300 grams in body weight, were exposed for one hour to a dust-mixture of finely divided crystalline tetramethylammonium chlorodibromide in air. The test rats had been under observation in the laboratory for seven days prior to testing in order to insure their health and homogeneity as test animals. During this pre-test period the rats were maintained on standard laboratory rat ration. Food and water were permitted ad libitum.

The inhalation exposure was performed in an all glass exposure chamber having a capacity of 0.038 cubic meter. The concentration of the finely-divided tetramethylammonium chlorodibromide in air was 2.4 mg./l. As mentioned above, the exposure period was one hour, and the animals were under continuous observation during this period. Immediately following the exposure the test rats were returned to their stock cages and placed under observation for the subsequent 48 hours at which time the test was considered as being terminated.

There were no deaths among the test group of rats exposed for one hour to the finely-divided tetramethylammonium chlorodibromide at a concentration of 2.4 milligrams per liter either during the actual exposure or during the 48 hours subsequent to it.

The single dose acute percutaneous toxicity test was carried out on healthy, young adult, New Zealand strain albino rabbits. The test rabbits averaged 2.5 kilograms in body weight and a single group of ten rabbits were employed in evaluating the percutaneous toxicity of the test material. The rabbits were equally divided as to sex and had been maintained under observation in the laboratory for seven days prior to the initiation of toxicological testing in order to insure their general health and physical well-being. During this pre-test period the rabbits were housed in individual stock cages and maintained upon standard laboratory rabbit ration. On the day prior to the percutaneous applications, the rabbits were depilated upon the posterior region of the dorsum of the trunk using electric clippers. The hair-free area created by the depilation procedure corresponded to approximately 10 percent of the total body surface. Following the clipping procedure, the rabbits were returned to their stock cages, and 24 hours were allowed to elapse before the percutaneous applications were administered. This period permitted the animals to recover from any skin irritation and allowed healing of any slight microscopic abrasions which might have been produced by the clipping procedure.

On the testing day, the test rabbits were placed in immobilizing stocks and the crystalline tetramethylammonium chlorodibromide was administered undiluted as a dose of 200 mg./kg. This dose was applied evenly to the exposure sites on the backs of each test rabbit. After application the exposure site on each animal was covered with an impervious plastic sheeting which was firmly taped to the animal.

The test rabbits were placed in stock cages and the test material was allowed to remain in contact with the skin for 24 hours after which the plastic sheeting (together with any excess test material) was removed. Observation of all rabbits was continued for 48 hours at which time the test was concluded.

Two of the ten test animals tested succumbed within 24 hours after the percutaneous applications. The other eight rabbits survived the 24 hour continuous contact period, and no deaths occurred subsequently during a 48 hour observation period. Post-mortem examination of the two animals which died revealed hemorrhagic lungs.

In the foregoing tests, it will be noted that relatively heavy dosages of tetramethylammonium chlorodibromide were employed in each test. These tests clearly show that little danger of toxicity can arise from the handling of tetramethylammonium chlorodibromide in connection with its use in the sterilization of water by the method in accordance with this invention. The results of the ten single dose acute oral toxicity tests demonstrate that the accidental swallowing of the tetramethylammonium chlorodibromide during its handling and use cannot result in serious consequences. The ten single dose acute inhalation toxicity tests show that the inhalation of the tetramethylammonium chlorodibromide dust, likewise is not serious. The single dose acute percutaneous toxicity test resulted in the death of two of ten test rabbits. However, it is to be noted that each of the ten test rabbits had 10 percent of their total body surface in contact with the tetramethylammonium chlorodibromide for a period of twenty-four hours. The fact that eight of the test rabbits survived this severe test demonstrates that no ill effects can arise from any short contact with the material which is likely to occur in its usage following reasonable precautions to avoid prolonged contact with the material.

The tests conducted with the synthetic mixture consisting of an aqueous solution containing 2000 milligrams per liter of tetramethylammonium chloride and 3575 milligrams of ammonium bromide were: eye irritation tests—albino rabbits; repeated insult patch tests—humans.

Five healthy young adult male albino rabbits were employed in the evaluation of the eye irritating properties of the synthetic test solution. The test animals were of the New Zealand strain and averaged 2.5 kilograms in body weight.

The method of Woodard and Draize was employed in the eye irritation studies. Exactly 0.1 ml. of the synthetic test solution was instilled into the conjunctival sac of the right eye of each test rabbit. The left eye of each animal served as a control.

One, 24, 48, 72, 96 hours, and 7 days after the initial instillations, the cornea, iris, and palpebral conjunctiva were examined and individually graded for irritation according to a standard scoring system. The maximum possible score at any one examination period is 110 points which indicates maximal irritation and damage to all three ocular tissues. Zero score indicates no irritation whatever.

The results of these tests are presented by Table IV.

The repeated insult technique was used in the patch tests. A series of nine patches were placed on each of the 50 subjects. This series was followed later by one additional challenge patch to detect skin sensitization. The series of nine patches were applied every Monday, Wednesday, and Friday over a three-week period. Two weeks following the ninth patch application the single challenge patch was placed on each test subject.

TABLE IV

*Eye Irritation Tests—Albino Rabbits*

| Tissue | Rabbit Number | 1 Hour | 24 Hours | 48 Hours | 72 Hours | 96 Hours | 7 Days | Maximum Possible Score |
|---|---|---|---|---|---|---|---|---|
| Cornea | 1 | 0 | 0 | 0 | 0 | 0 | 0 | 80 |
| Iris |  | 0 | 0 | 0 | 0 | 0 | 0 | 10 |
| Conjunctiva |  | 2 | 0 | 0 | 0 | 0 | 0 | 20 |
| Total |  | 2 | 0 | 0 | 0 | 0 | 0 | 110 |
| Cornea | 2 | 0 | 0 | 0 | 0 | 0 | 0 | 80 |
| Iris |  | 0 | 0 | 0 | 0 | 0 | 0 | 10 |
| Conjunctiva |  | 2 | 0 | 0 | 0 | 0 | 0 | 20 |
| Total |  | 2 | 0 | 0 | 0 | 0 | 0 | 110 |
| Cornea | 3 | 0 | 0 | 0 | 0 | 0 | 0 | 80 |
| Iris |  | 0 | 0 | 0 | 0 | 0 | 0 | 10 |
| Conjunctiva |  | 0 | 0 | 0 | 0 | 0 | 0 | 20 |
| Total |  | 0 | 0 | 0 | 0 | 0 | 0 | 110 |
| Cornea | 4 | 0 | 0 | 0 | 0 | 0 | 0 | 80 |
| Iris |  | 0 | 0 | 0 | 0 | 0 | 0 | 10 |
| Conjunctiva |  | 0 | 0 | 0 | 0 | 0 | 0 | 20 |
| Total |  | 0 | 0 | 0 | 0 | 0 | 0 | 110 |
| Cornea | 5 | 0 | 0 | 0 | 0 | 0 | 0 | 80 |
| Iris |  | 0 | 0 | 0 | 0 | 0 | 0 | 10 |
| Conjunctiva |  | 0 | 0 | 0 | 0 | 0 | 0 | 20 |
| Total |  | 0 | 0 | 0 | 0 | 0 | 0 | 110 |
| Averages: |  |  |  |  |  |  |  |  |
| Cornea |  | 0 | 0 | 0 | 0 | 0 | 0 | 80 |
| Iris |  | 0 | 0 | 0 | 0 | 0 | 0 | 10 |
| Conjunctiva |  | 0.8 | 0 | 0 | 0 | 0 | 0 | 20 |
| Total |  | 0.8 | 0 | 0 | 0 | 0 | 0 | 110 |

As shown by the data of the foregoing Table IV, this synthetic test solution caused only extremely mild and transient eye irritation.

The repeated insult patch tests with the synthetic aqueous solution were made on fifty human subjects after screening-type skin irritation tests on rats and rabbits. These preliminary tests were 24 hour skin contact tests. The results of these preliminary tests on the lower animals indicated that the synthetic solution was lacking in any significant primary skin irritating properties.

The composition of the human test population used in the repeated insult patch tests is given by Table V.

TABLE V

*Skin Irritation and Sensitization Tests—Human Composition of Test Population*

| Subject Code Numbers | Sex | Race | Number of Subjects | Age Range (Years) |
|---|---|---|---|---|
| 1–22 | Male | White | 22 | 21–73. |
| 23–24 |  | Colored | 2 | 26 and 28. |
| 25 |  | Indian | 1 | 25. |
| Sub-Total |  |  | 25 |  |
| 26–44 | Female | White | 19 | 19–63. |
| 45–49 |  | Colored | 5 | 36–59. |
| 50 |  | Indian | 1 | 23. |
| Sub-Total |  |  | 25 |  |
| Total |  |  | 50 |  |

The skin applications were made using oval shaped adhesive patches (1″ x 1½″) with circular gauze centers. The centers of the patches were saturated with test material immediately prior to application on the test subjects. The patches were placed on the flexor surfaces of the upper arms of the test subjects and remained in site for 24 hours after which they were removed and the sites graded for irritation. Twenty-four hours were then permitted to elapse before the next patch was applied. (A 48 hour interval elapsed between the scorings on Saturdays (of patches placed on Fridays) and the Monday patch applications.)

The scoring system used in grading irritation is shown in Table VI.

TABLE VI

*Skin Irritation and Sensitization Tests—Humans*
SCORING SYSTEM

| General Description of Reaction | Irritation Scores Assigned |
|---|---|
| No reaction | 0 |
| Slight erythema (contact area barely delimited and erythema just perceptible) | 1 |
| Well-defined erythema (contact area clearly defined; erythema distinct and pink to light red in color) | 2 |
| Moderate to severe erythema with slight edema (contact area bright red to scarlet or beet redness in color; contact area slightly raised) | 3 |
| Severe erythema with pronounced edema (contact area shows intense redness with evidence of eschar formation; distinct edema) | 4 |

The experimental data obtained from these repeated insult patch tests are summarized by Table VII.

TABLE VII

*Skin Irritation and Sensitization Tests—Humans*

SUMMARY OF DATA

|  |  | Number of subjects | Number of applications | Number of reactions |  |  |  |  |
|---|---|---|---|---|---|---|---|---|
|  |  |  |  | 4 | 3 | 2 | 1 | 0 |
| Primary skin irritation. | Males | 25 | 225 | 0 | 0 | 0 | 0 | 225 |
|  | Females | 25 | 225 | 0 | 0 | 0 | 0 | 225 |
| Total |  | 50 | 450 | 0 | 0 | 0 | 0 | 450 |
| Skin sensitization | Males | 25 | 25 | 0 | 0 | 0 | 0 | 25 |
|  | Females | 25 | 25 | 0 | 0 | 0 | 0 | 25 |
| Total |  | 50 | 50 | 0 | 0 | 0 | 0 | 50 |

From the data presented by Table VII, it will be noted that not a single skin irritation reaction and not a single skin sensitization reaction was obtained with the fifty individuals subjected to the repeated insult patch test.

In considering the foregoing data obtained by the eye irritation tests and the repeated insult patch tests it will be borne in mind that the synthetic solution containing 2000 milligrams per liter of tetramethylammonium chloride and 3575 milligrams per liter of ammonium bromide simulates the composition which results from the decomposition of 4917 milligrams per liter (parts per million) of tetramethylammonium chlorodibromide in water. Hereinbefore, it is noted that the tetramethylammonium chlorodibromide is used, for example, to sterilize swimming pool water in an amount within the range of about 0.66 to about 2.2 ounces for each 10,000 gallons of water, and that about 1.3 ounces per 10,000 gallons of water is adequate to effect sterilization of the water. Since one ounce per 10,000 gallons of water is approximately 0.75 part per million, by weight, the maximum amount of the tetramethylammonium chlorodibromide which is used under any ordinary circumstances is about 1.65 parts per million of the tetramethylammonium chlorodibromide. From this, it can be appreciated that the synthetic test solution approximates the concentration of decomposition products which will result from the use of 2980 times the maximum quantity of tetramethylammonium chlorodibromide which is normally used, for example in sterilizing the water of a swimming pool.

The eye irritation tests on the five rabbits with this relatively concentrated synthetic aqueous solution show that it is quite unlikely that the normal addition of tetramethylammonium chlorodibromide to a swimming pool while it is in use is quite unlikely to irritate the eyes of swimmers using the pool.

The skin irritation and sensitization tests with the synthetic solution were made very thorough in view of the results of the single dose acute percutaneous toxicity tests of the tetramethylammonium chlorodibromide on albino rabbits. The fact that the synthetic aqueous solution did not cause a single case even of mild irritation with any of the fifty people who were subjected to the test shows that the normal usage of tetramethylammonium chlorodibromide in a swimming pool is quite unlikely to irritate the skin of swimmers in the pool.

In the use of tetramethylammonium chlorodibromide to sterilize potable water the decomposition products are, of course, swallowed. Also, there is the probability that swimmers will swallow swimming pool water. The single dose acute toxicity tests on the albino rats using tetramethylammonium chlorodibromide itself as a test material clearly shows that no danger can arise from this source in the use of the material as a sterilizing agent either for potable water or for swimming pool water.

In connection with these tests it is to be noted that tetramethylammonium chlorodibromide is potentially more dangerous per se than the decomposition products it forms by reaction with water, due to the fact that it releases elemental bromine which in turn reacts with water. However, there is the possibility that a swimmer might swallow a small particle of tetramethylammonium chlorodibromide, before it has a chance to dissolve and react with the water, although the probability is remote in view of the rapidity with which the material dissolves in water.

As noted hereinbefore, in the acute oral toxicity tests the tetramethylammonium chlorodibromide was introduced directly into the stomachs of ten albino rats in the form of a suspension in propylene glycol at the dosage rate of 50 milligrams per kilo of body weight. Propylene glycol is completely miscible with water, so the tetramethylammonium chlorobromide was free to react with the aqueous fluids in the digestive tracts of the rats. The dosage of 50 milligrams per kilo of body weight is the equivalent of a swimmer weighing 150 pounds swallowing 0.12 avoirdupois ounce of unreacted tetramethylammonium chlorodibromide. The probability of such an occurrence is vanishingly small. The fact that none of the test group of ten rats were killed by this heavy dosage of the tetramethylammonium chlorodibromide shows that the probability of difficulty arising either from swallowing the tetramethylammonium chlorodibromide or its decomposition products in their normal usage in sterilizing water is vanishingly remote.

The toxicity of chlorine, bromide and iodine in the concentrations in which they are used for sterilizing water is known to be within safe limits. Since it is the higher molecular weight halogen atoms which are released by the decomposition of the tetraalkylammonium polyhalides, the foregoing toxicity tests on tetramethylammonium chlorodibromide demonstrate that any tetraalkylammonium polyhalide containing a chlorine atom is safe to use since tetramethylammonium chloride is formed in each case. The test indications are that the corresponding bromides and iodides are equally safe in the use of the corresponding tetraalkylammonium polyhalides in the quantities required to effectively sterilize water.

In the foregoing, the embodiment of the method in accordance with this invention in which tetramethylammonium chlorodibromide is used has been selected for the purpose of fully exemplifying the method and specifically illustrating its definite advantages over prior methods for sterilizing swimming pool water. Similar data has fully demonstrated the effectiveness and the advantages of alternative embodiments of the method in which the other tetraalkylammonium polyhalides are used as the sterilizing agents.

Details concerning this method and specific data have been presented in the foregoing for the purpose of fully explaining the invention and it will be obvious to those skilled in the art to which this invention relates that numerous changes and variations can be made in the details set forth without departing from the spirit of the invention or the scope of the following claims.

I claim:

1. A method for sterilizing water which comprises dissolving therein an amount of tetramethylammonium chlorodibromide within the range of about 1.0 avoirdupois ounce to about 4.4 avoirdupois ounces for each 10,000 gallons of water present.

2. A method for sterilizing water which comprises dissolving therein an amount of tetramethylammonium chlorodibromide which produces a residual bromine content in the water within the range of about 0.4 part per million to about 2.0 parts per million.

3. A method for sterilizing water which comprises continuously dissolving therein tetramethylammonium chlorodibromide at a rate which maintains a residual bromine content within the range of about 0.4 part per million to about 2.0 parts per million.

4. A method for sterilizing water which comprises dissolving therein an amount of tetramethylammonium bromodichloride which produces a residual halogen content in the water within the range of about 0.4 part per million to about 2.0 parts per million.

5. A method for sterlizing water which comprises continuously dissolving therein tetramethylammonium bromodichloride at a rate which maintains a residual halogen content within the range of about 0.4 part per million to about 2.0 parts per million.

6. A method for sterilizing water which comprises dissolving therein an amount of tetramethylammonium triiodide which produces a residual iodine content in the water within the range of about 0.4 part per million to about 2.0 parts per million.

7. A method for sterilizing water which comprises continuously dissolving therein tetramethylammonium triiodide at a rate which maintains a residual iodine content within the range of about 0.4 part per million to about 2.0 parts per million.

8. A method for sterilizing water which comprises dissolving therein an amount of tetramethylammonium iodotetrachloride which produces a residual halogen content in the water within the range of about 0.4 part per million to about 2.0 parts per million.

9. A method for sterilizing water which comprises continuously dissolving therein tetramethylammonium iodotetrachloride at a rate which maintains a residual halogen content within the range of about 0.4 part per million to about 2.0 parts per million.

10. A method for sterilizing water which comprising dissolving therein an amount of tetramethylammonium tribromide which produces a residual bromine content in the water within the range of about 0.4 part per million to about 2.0 parts per million.

11. A method for sterilizing water which comprises continuously dissolving therein tetramethylammonium tribromide at a rate which maintains a residual bromine content within the range of about 0.4 part per million to about 2.0 parts per million.

12. A method for sterilizing water which comprises:
(a) dissolving therein tetraalkylammonium polyhalide wherein the polyhalide is selected from the group consisting of enneaiodide, heptaiodide, pentaiodide, triiodide, bromohexaiodide, bromodiiodide, chlorotetraiodide, chlorodiiodide, iododichloride, iododibromide, chlorobromoiodide, tribromide, bromodichloride, iodotetrachloride and chlorodibromide and in which the alkyl groups are lower alkyl groups containing one to six carbon atoms and are selected from the group consisting of unsubstituted and halogenated lower alkyl groups, which produces a residual halogen content in the water within the range of 0.4 part per million to 2.0 parts per million.

13. A method for sterilizing water which comprises:
(a) dissolving therein tetraalkylammonium polyhalide wherein the polyhalide is selected from the group consisting of enneaiodide, heptaiodide, pentaiodide, triiodide, bromohexaiodide, bromodiiodide, chlorotetraiodide, chlorodiiodide, iododichloride, iododibromide, chlorobromoiodide, tribromide, bromodichloride, iodotetrachloride and chlorodibromide and in which the alkyl groups are lower alkyl groups containing one to six carbon atoms selected from the group consisting of unsubstituted and halogenated lower alkyl groups, said tetraalkylammonium polyhalide carrying at least about 40% by weight of the releasable free halogen, which produces a residual halogen content in the water within the range of 0.4 part per million to 2.0 parts per million.

References Cited in the file of this patent
UNITED STATES PATENTS

| | | |
|---|---|---|
| 2,662,855 | Kamlet | Dec. 15, 1953 |
| 2,679,533 | Darragh et al. | May 25, 1954 |
| 2,740,744 | Abramitis et al. | Apr. 3, 1956 |
| 2,746,928 | Darragh et al. | May 22, 1956 |
| 2,751,713 | Abramitis | June 26, 1956 |
| 2,863,798 | Shelanski et al. | Dec. 9, 1958 |
| 2,868,686 | Shelanski et al. | Jan. 13, 1959 |

UNITED STATES PATENT OFFICE
CERTIFICATE OF CORRECTION

Patent No. 3,152,073　　　　　　　　　　　　October 6, 1964

John R. Morton

It is hereby certified that error appears in the above numbered patent requiring correction and that the said Letters Patent should read as corrected below.

Column 3, line 48, for "hydrochlorite" read -- hypochlorite --; column 4, line 32, for "Diethyldihexylammonium" read -- Dimethyldihexylammonium --; column 5, line 65, for "chlorodibromlde" read -- chlorodibromide --.

Signed and sealed this 27th day of April 1965.

(SEAL)
Attest:

ERNEST W. SWIDER　　　　　　　　　　　　EDWARD J. BRENNER
Attesting Officer　　　　　　　　　　　　Commissioner of Patents